(12) United States Patent
Gross et al.

(10) Patent No.: US 11,035,592 B1
(45) Date of Patent: Jun. 15, 2021

(54) HELIOSTAT ARRAY WITH INFLATABLE COVER

(71) Applicants: William Gross, Pasadena, CA (US); Andrea Pedretti, Bellinzona (CH)

(72) Inventors: William Gross, Pasadena, CA (US); Andrea Pedretti, Bellinzona (CH)

(73) Assignee: Heliogen, Inc., Pasadena, CA (US)

( * ) Notice: Subject to any disclaimer, the term of this patent is extended or adjusted under 35 U.S.C. 154(b) by 108 days.

(21) Appl. No.: 16/192,249

(22) Filed: Nov. 15, 2018

Related U.S. Application Data

(60) Provisional application No. 62/588,219, filed on Nov. 17, 2017.

(51) Int. Cl.
*F24S 40/10* (2018.01)
*F24S 80/50* (2018.01)
*F24S 80/525* (2018.01)
*H02S 40/00* (2014.01)

(52) U.S. Cl.
CPC ............ *F24S 40/10* (2018.05); *F24S 80/525* (2018.05); *H02S 40/00* (2013.01); *F24S 2080/503* (2018.05)

(58) Field of Classification Search
CPC .... F24S 40/10; F24S 80/525; F24S 2080/503; F24S 20/20; F24S 23/70; F24S 2023/87; F24S 40/40; H02S 40/00; H02S 30/20
See application file for complete search history.

(56) References Cited

U.S. PATENT DOCUMENTS

| 4,252,107 | A  * | 2/1981  | Horton    | F24S 30/452 126/605 |
| 4,283,887 | A  * | 8/1981  | Horton    | F24S 80/58 52/2.17 |
| 4,691,075 | A  * | 9/1987  | Murphy    | F24S 30/452 136/246 |
| 2006/0193066 | A1 * | 8/2006  | Prueitt    | F24S 23/70 359/853 |
| 2009/0025711 | A1 * | 1/2009  | Edwards    | A01G 9/243 126/704 |
| 2009/0086348 | A1 * | 4/2009  | Xie        | F24S 23/71 359/853 |
| 2010/0300660 | A1 * | 12/2010 | Bourgault  | B64F 5/27 165/104.34 |
| 2012/0152307 | A1 * | 6/2012  | MacGregor  | A01G 9/243 136/246 |

(Continued)

*Primary Examiner* — Jorge A Pereiro
(74) *Attorney, Agent, or Firm* — Andrew S. Naglestad (57) ABSTRACT

A solar collector system comprising at least one heliostat and an inflatable cover configured to protectively conceal the at least one heliostat while it tracks the sun. The inflatable cover comprises a flexible membrane, which is transparent and colorless so that sunlight is transmitted through the cover. The cover may comprise an elastomeric material such as ethylene tetrafluoroethylene (ETFE). The solar collector system may further include a pump for inflating the inflatable cover, a pressure relief valve configured to prevent air pressure in the inflatable cover from exceeding a predetermined threshold, and a pressure sensor configured to automatically turn on the pump when the internal pressure falls below a predetermined threshold. The inflatable cover effectively removes wind loading from the heliostats, thus enabling the heliostats to use low-power, less-expensive actuators.

12 Claims, 7 Drawing Sheets

(56) References Cited

U.S. PATENT DOCUMENTS

| | | | |
|---|---|---|---|
| 2013/0192585 A1* | 8/2013 | von Behrens | F24S 50/20 |
| | | | 126/601 |
| 2013/0306135 A1* | 11/2013 | Planting | F24S 23/715 |
| | | | 136/246 |
| 2014/0069416 A1* | 3/2014 | von Behrens | F24S 25/50 |
| | | | 126/694 |
| 2014/0238464 A1* | 8/2014 | Vesborg | F24S 20/80 |
| | | | 136/245 |

* cited by examiner

HELIOSTAT ARRAY WITH INFLATABLE COVER

CROSS-REFERENCE TO RELATED APPLICATION(S)

This application claims the benefit of U.S. Provisional Patent Application Ser. No. 62/588,219 filed Nov. 17, 2017, titled "HELIOSTAT ARRAY WITH INFLATABLE COVER," which is hereby incorporated by reference herein for all purposes.

TECHNICAL FIELD

The invention relates to a system for isolating a heliostat from the environment. In particular, the invention relates to a transparent shell for protecting heliostats from wind and debris.

BACKGROUND

Solar tracking systems are typically employed in desert areas. Although sunlight is plentiful, the solar tracking systems installed in the desert must be able to withstand and operate in strong winds. This generally means that the heliostat must be designed with a heavy-duty frame to remain upright during heavy winds, and with heavy-duty motors to turn the mirror in the presence of wind loading. The rigid design and powerful motors add significant expense to the cost of construction of heliostats. There is therefore a need for a heliostat design that can withstand wind loading with minimal costs.

SUMMARY

The invention in the preferred embodiment features a solar collector system comprising at least one heliostat; an inflatable cover configured to protectively conceal the at least one heliostat while it tracks the sun; and a pump for inflating the inflatable cover. The inflatable cover comprises a flexible membrane, which is transparent and colorless so that sunlight is transmitted through the cover. The cover may comprise an elastomeric material such as ethylene tetrafluoroethylene (ETFE). The solar collector system may further include a pressure relief valve configured to prevent air pressure in the inflatable cover from exceeding a predetermined threshold, as well as a pressure sensor configured to automatically turn on the pump when the internal pressure falls below a predetermined threshold. In some embodiments, the solar collector system further includes one or more sensors to detect a distance between the top of the heliostats and the inflatable cover and pressurize the cover if that distance falls below a predetermined threshold, thereby preventing contact between the cover and heliostats.

The presence of the cover, when inflated, absorbs the impact of the wind, thereby preventing damage to the heliostats. In addition, the inflatable cover effectively removes wind loading on the heliostats, thus enabling the heliostats to use low-power, less-expensive actuators to aim the mirror or photovoltaic panel.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Illustrated in FIGS. 1-5 is a heliostat array that is protectively concealed by an inflatable cover. The plurality of heliostats are arrayed in a rectilinear grid including a plurality of rows and columns. Each of the plurality of heliostats 110 is configured to track the sun over the course of the day and reflect sunlight to a receiver (not shown) that converts the incident light to electricity or other form of usable energy. The plurality of heliostats 110 are affixed to a foundation 150 comprising a concrete pad, for example.

The inflatable cover 120 is designed to protectively conceal the plurality of heliostats 110 from environmental forces and debris including wind, snow, rain, and dust, for example. The inflatable cover 120 is a transparent flexible membrane configured to transmit optical and infrared light with little attenuation or absorption. In the preferred embodiment, the cover is made from a thin sheet of Ethylene tetrafluoroethylene (ETFE), where the sheet is about 16-200 micrometers in thickness. When inflated, the cover 120 may have the shape, in cross section, of a semicircle, partial ellipse, partial oval, dome, or half-pipe, for example.

The cover 120 is affixed to the foundation 150 using an airtight seal 122 around the perimeter of the heliostat array. The cover further includes a pneumatic pump 124 configured to pump air or other gas to inflate the center of the cover above the heliostats 110. The pump 124 may include a pressure sensor configured to automatically activate the pump when the internal pressure drops below a predetermined threshold in order to maintain clearance between the cover 120 and the heliostats. The pressure sensor may also be configured to automatically turn off the pump when the internal pressure reaches a predetermined maximum. In the preferred embodiment, the target internal pressure is about 5 millibars, although the pressure may range between 4 and 6 millibars.

The inflatable cover may further include a pressure valve (not shown) for automatically lowering the pressure when, for example, the heat of the sun increases the internal temperature and pressure under the cover. In some embodiments, the heliostat array includes sensors configured to detect the height of the cover and automatically activate the pump and increase internal pressure when the cover 120 is too close to a heliostat 110, e.g., when the cove is within one foot of a heliostat.

Figure 1:
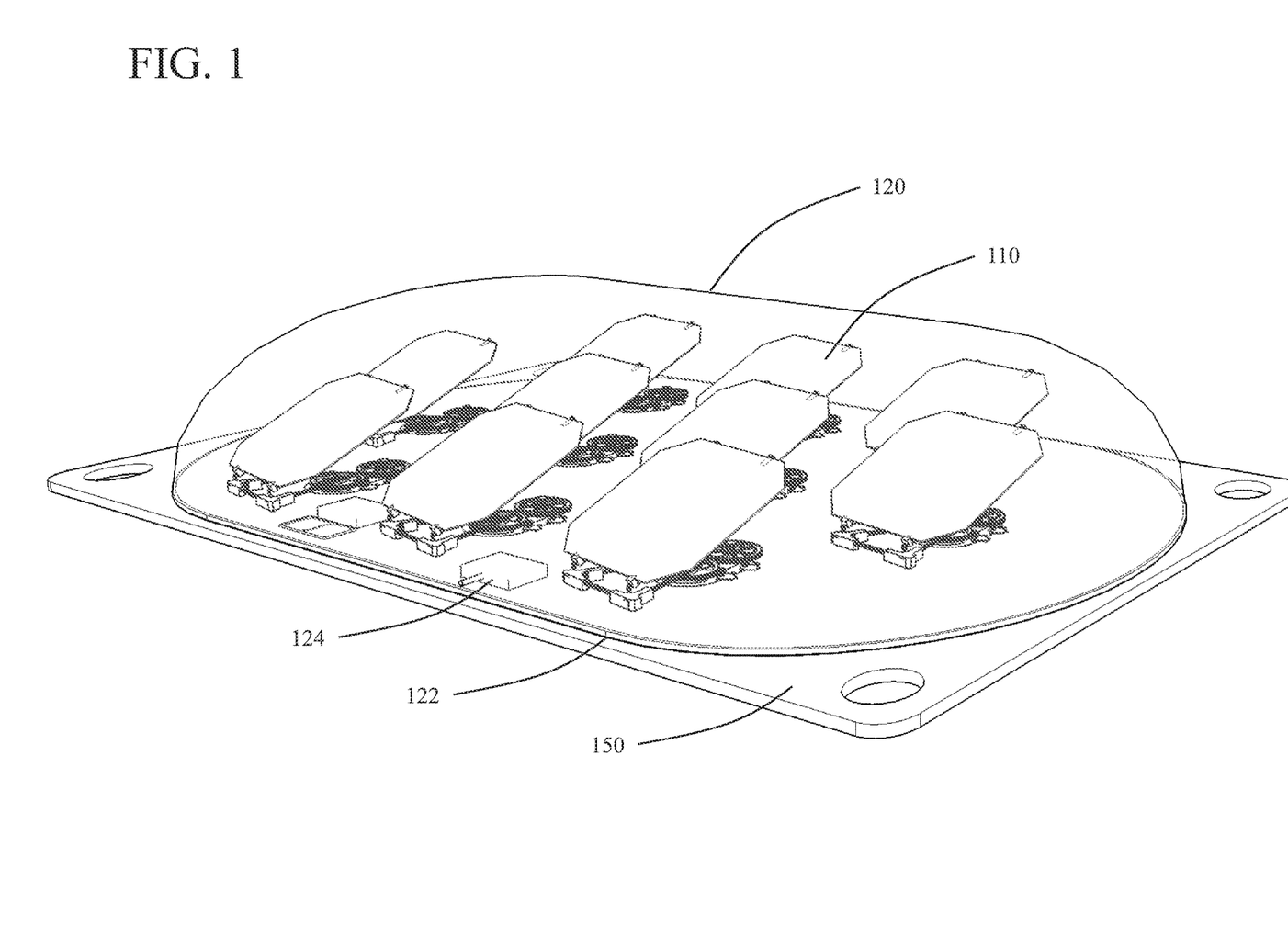
FIG. 1 is a perspective view of a heliostat array in an inflatable cover, in accordance with a preferred embodiment of the present invention.
Figure 2:
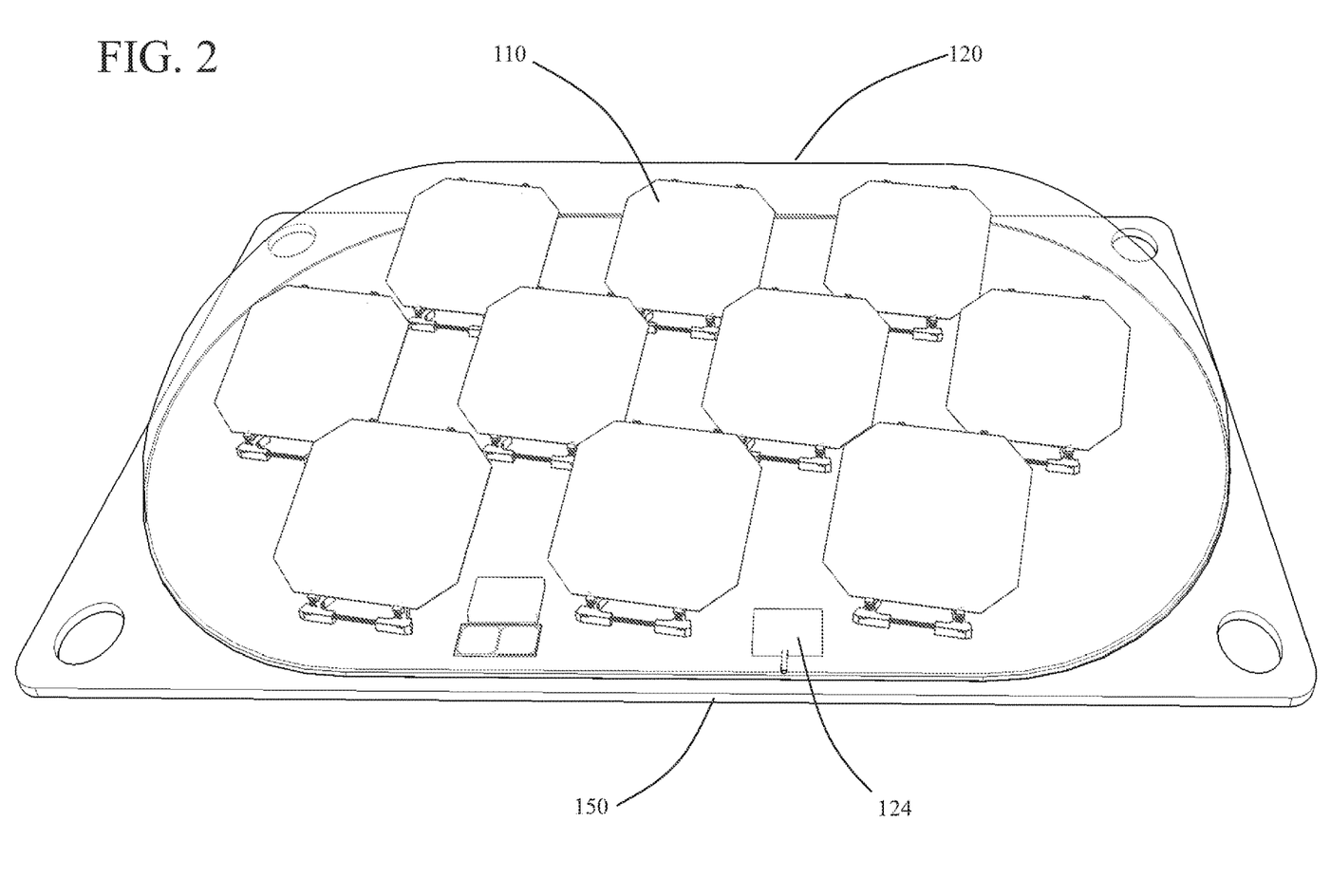
FIG. 2 is a front view of a heliostat array in an inflatable cover, in accordance with a preferred embodiment of the present invention.
Figure 3:
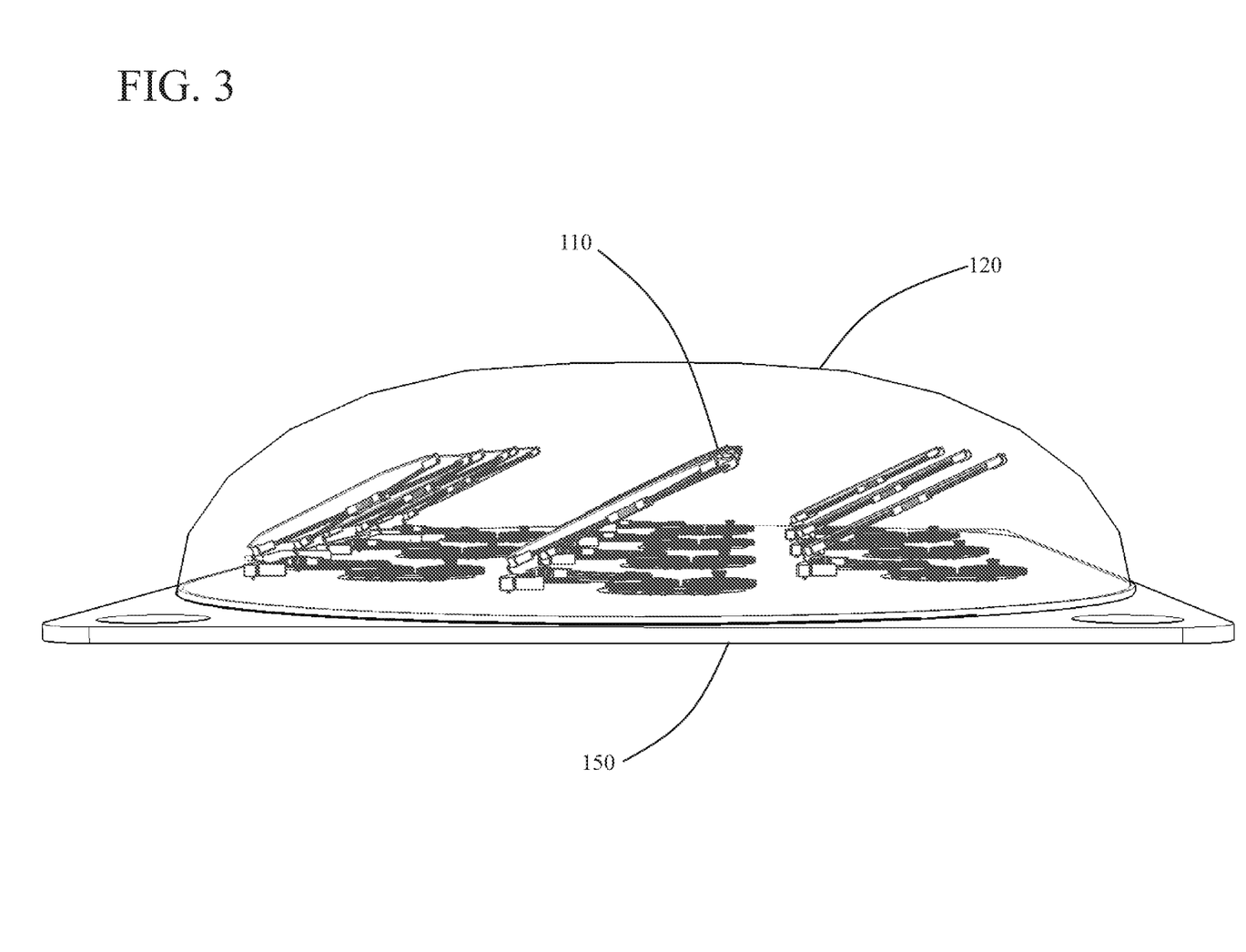
FIG. 3 is a side view of a heliostat array in an inflatable cover, in accordance with a preferred embodiment of the present invention.
Figure 4:
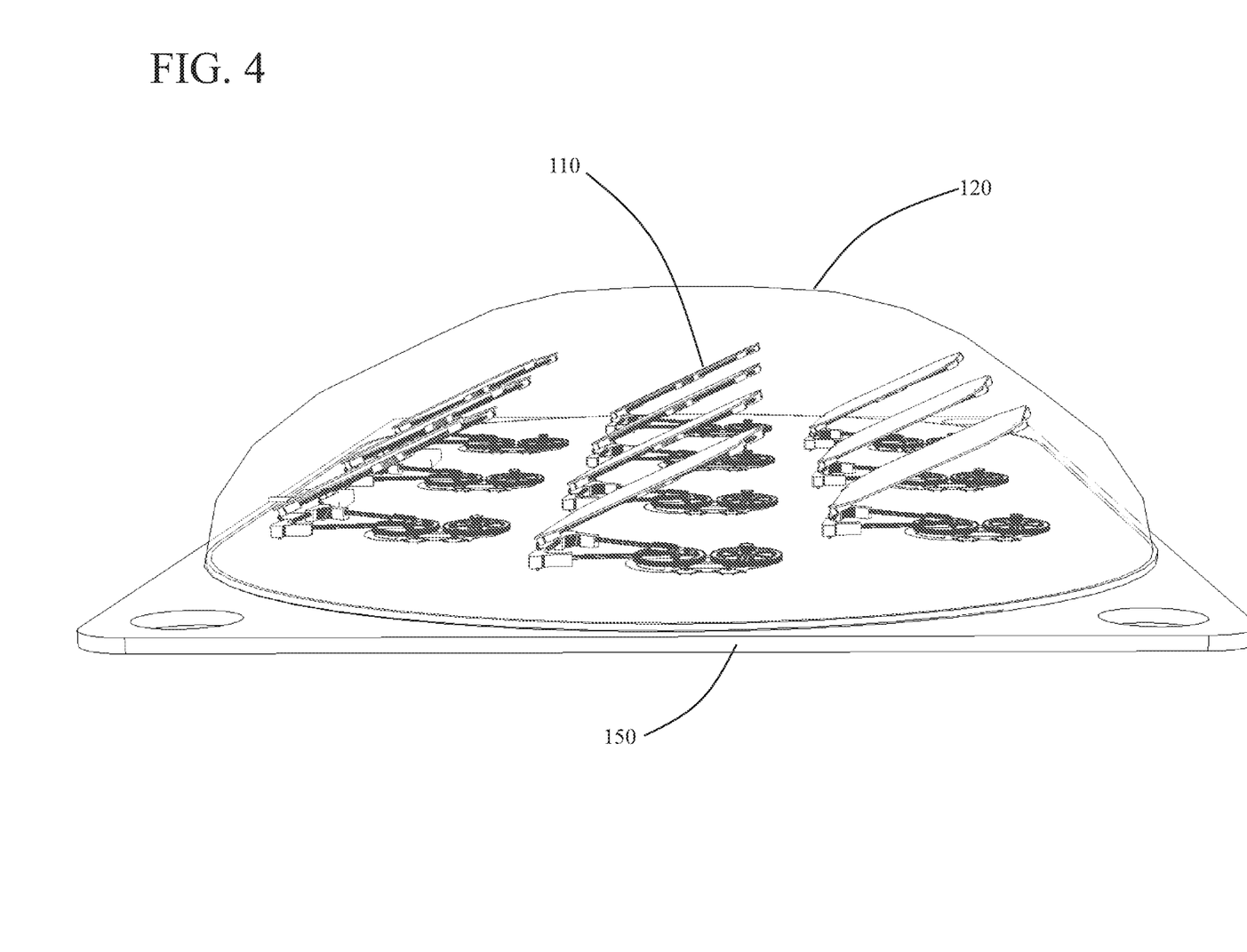
FIG. 4 is a side view of a heliostat array in an inflatable cover, in accordance with a preferred embodiment of the present invention.
Figure 5:
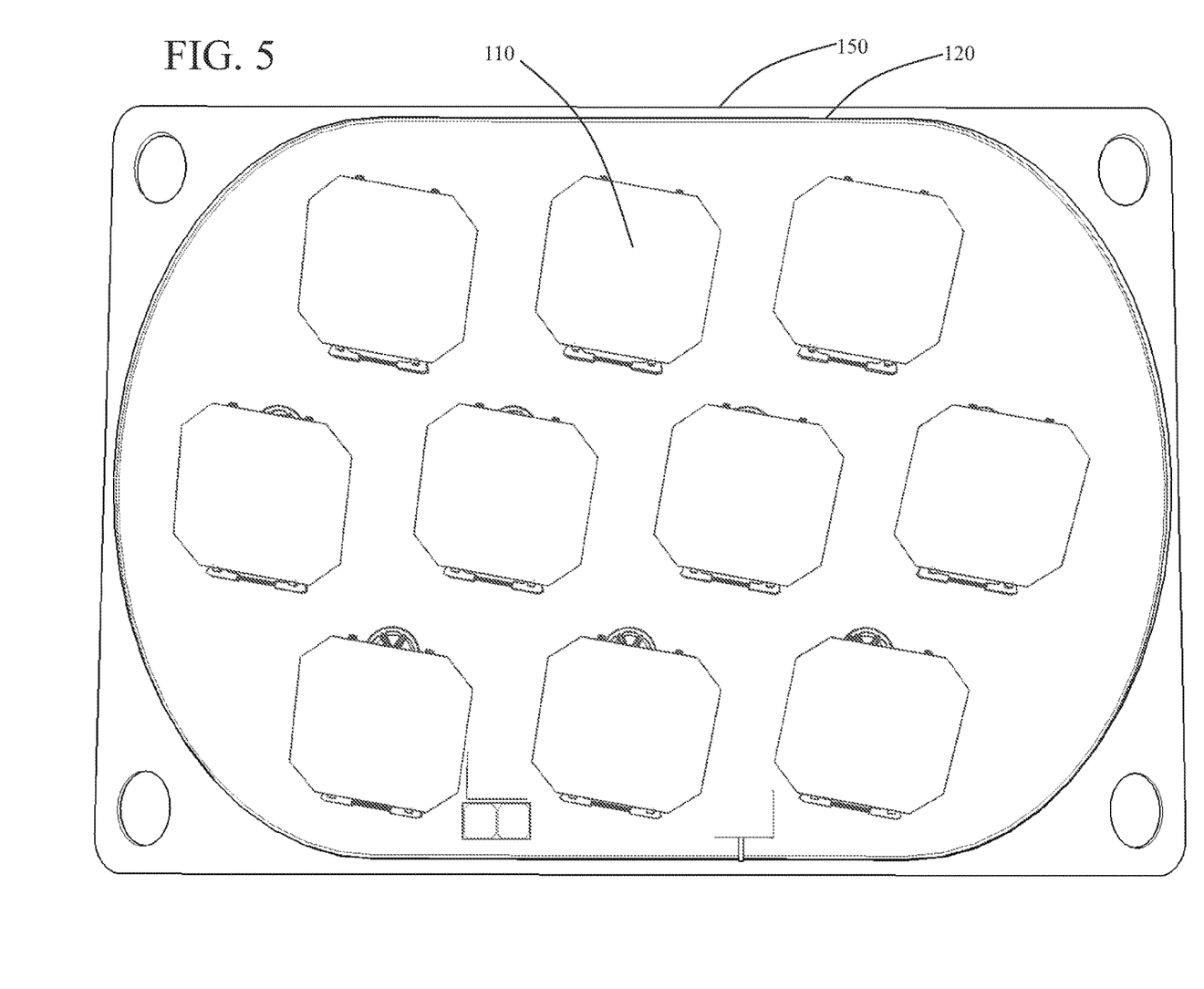
FIG. 5 is a top view of a heliostat array in an inflatable cover, in accordance with a preferred embodiment of the present invention.
Figure 6:
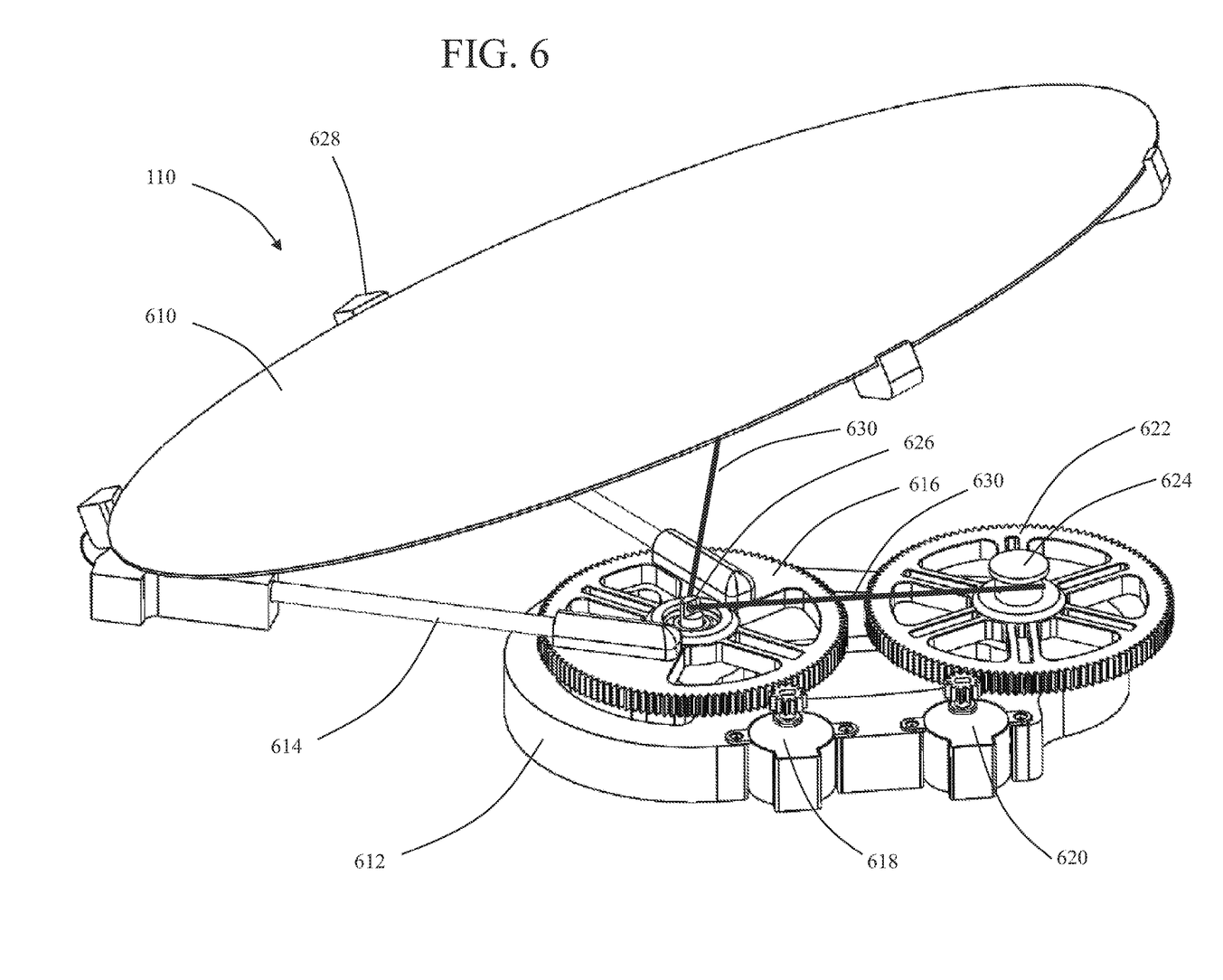
FIG. 6 is a perspective view of a heliostat, in accordance with a preferred embodiment of the present invention.
Figure 7:
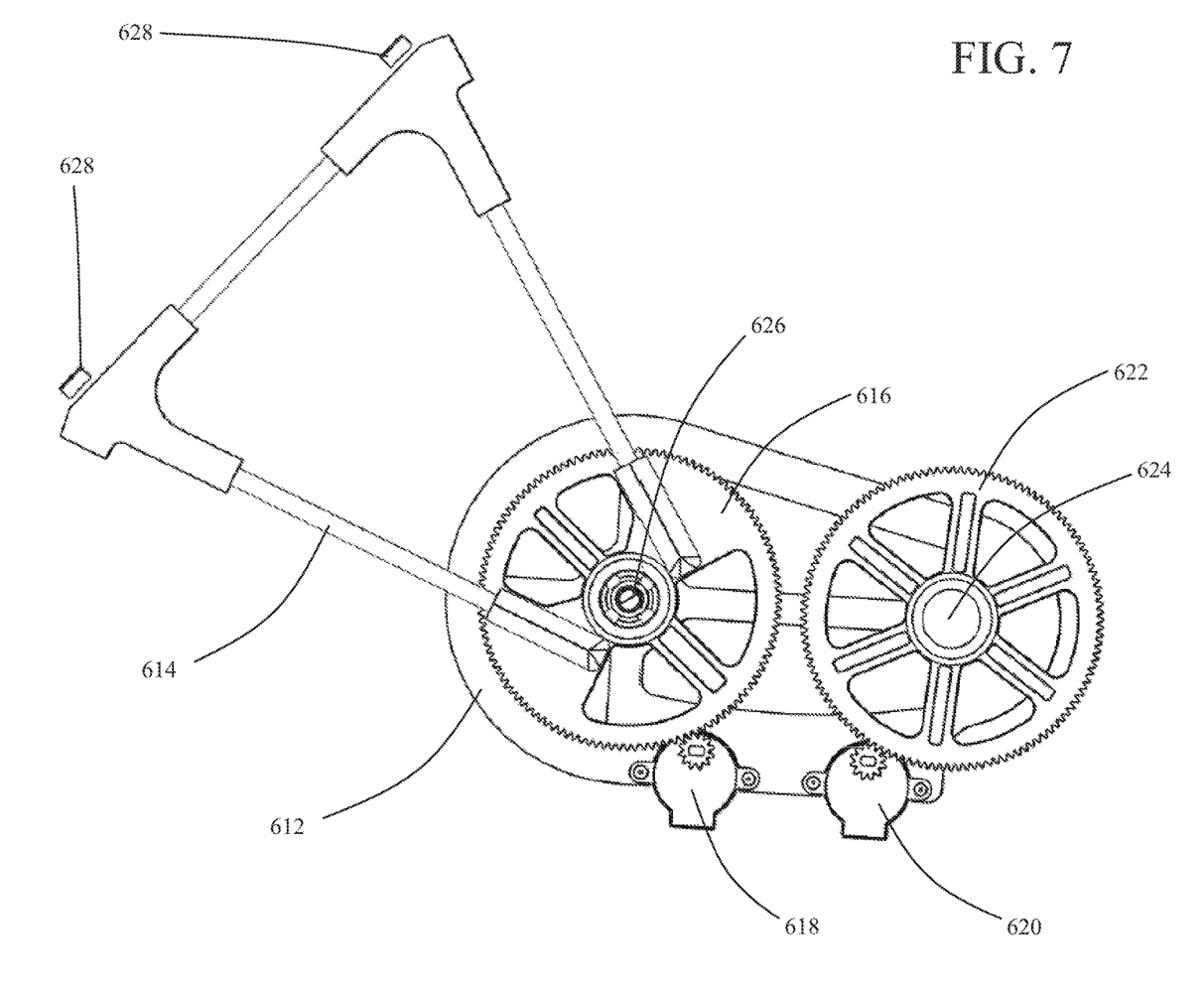
FIG. 7 is a perspective view of a heliostat without mirror, in accordance with a preferred embodiment of the present invention.

Illustrated in FIGS. 6 and 7 is an individual heliostat 110 comprising a mirror 610 that tracks the sun by varying two degrees of freedom. The mirror 610 is connected to a base 612 that is affixed to the foundation 150. In particular, the mirror 610 is mounted to hinges 628, which are mounted to arms 614. Biasing springs (not shown) internal to the hinges 628 assert a torque on the mirror 610 that biases the mirror away from the arms 614. The arms 614 are, in turn, rigidly mounted to a main gear 616 that rotates relative to the base 612 about a vertical axis. The main gear 616 rotates in response to a motor or actuator 618 that is affixed to a drive gear engaging the main gear 616. When the motor 618 turns, the arms 614 swing in a horizontal plane, which causes the azimuth angle of the mirror 610 to change.

The base 612 further includes a second motor or actuator 620 for turning a drive gear coupled to another main gear 622. The main gear 622 is rigidly affixed to a spool around which a cable 630 is wound. The cable 630 runs from the spool 624, to a stationary eyelet 626, to a fixed point on the backside of the mirror 610. When the motor 620 turns, the main gear 622 turns the spool to either wind up the cable 630 or unwind the cable. When the cable is wound up, the distal end of the cable pulls down the back of the mirror as it rotates about hinges 628 against the force of the biasing springs (not shown). When the mirror 610 swings downward, the elevation angle of the reflected light increases. When the cable is unwound, the distal end of the cable 630 lets the back of the mirror 610 rise under the force of the biasing springs (not shown) in the hinges 628, which effectively reduces the elevation angle of the reflected light.

A tracking controller (not shown) in the base 612 includes a processor configured to track the relative position of the sun and continuously direct reflected sunlight to the receiver (not shown). In the preferred embodiment, the heliostat 110 comprises a mirror 610 but the present invention may also employ a photovoltaic panel in some embodiments, instead of a mirror. In the case of a photovoltaic panel, the tracking controller is configured to maintain the PV panel at an orientation perpendicular to the incoming sunlight.

In the preferred embodiment, the inflatable cover protectively conceals the array of heliostats from wind and other environmental forces. As such, the heliostats experience less force from wind loading. The heliostats may, therefore, be constructed with lighter materials and operate using relatively low-power azimuth and elevation angle motors. The cost savings achieved with the lighter duty heliostats exceeds the costs associated with the inflatable cover, thereby making the invention an inexpensive and cost-effective solar collector.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A solar collector system comprising:
at least one heliostat;
an inflatable cover comprising a flexible, transparent membrane, wherein the inflatable cover is configured to protectively conceal the at least one heliostat while the at least one heliostat tracks the sun;
a pump configured to inflate the inflatable cover, and
at least one sensor configured to activate the pump when a distance between the inflatable cover and at least one heliostat falls below a predetermined threshold.

2. A solar collector system comprising:
a base;
at least one heliostat;
an inflatable cover attached to the base;
a pump for pressurizing the inflatable cover; and
at least one sensor configured to activate the pump when a distance between the inflatable cover and heliostat falls below a predetermined threshold:
wherein the inflatable cover is configured to protectively conceal the at least one heliostat while the at least one heliostat tracks the sun.

3. The solar collector system of claim 2, wherein the inflatable cover comprises a flexible membrane.

4. The solar collector system of claim 3, wherein the inflatable cover is transparent and colorless, whereby sunlight is transmitted through the cover.

5. The solar collector system of claim 4, wherein the cover comprises an elastomeric cover.

6. The solar collector system of claim 5, wherein the cover comprises ethylene tetrafluoroethylene (ETFE).

7. The solar collector system of claim 2, further comprising a pressure relief valve configured to prevent air pressure in the inflatable cover from exceeding a predetermined threshold.

8. The solar collector system of claim 7, further comprising a pressure sensor configured to activate the pump when air pressure in the inflatable cover falls below a predetermined threshold.

9. The solar collector system of claim 2, wherein the inflatable cover is configured to protectively conceal a plurality of heliostats.

10. The solar collector system of claim 2, wherein the at least one heliostat is configured to track the sun.

11. The solar collector system of claim 2, wherein the at least one heliostat comprises a mirror or a photovoltaic panel.

12. A solar collector system comprising:
- at least one heliostat;
- an inflatable cover comprising a flexible, transparent membrane, wherein the inflatable cover is configured to protectively conceal the at least one heliostat while the at least one heliostat tracks the sun, whereby sunlight is transmitted through the cover;
- a pump configured to inflate the inflatable cover to a predetermined pressure;
- at least one pressure sensor configured to activate the pump when air pressure in the inflatable cover falls below a predetermined threshold; and
- at least one sensor configured to activate the pump when a distance between the inflatable cover and heliostat falls below a predetermined threshold.

\* \* \* \* \*